March 7, 1950     J. U. LEHN     2,500,130
ANIMAL TRAP

Filed Feb. 26, 1947     5 Sheets-Sheet 1

INVENTOR.
JOHN U. LEHN

BY

Robert E. Burns
ATTORNEY.

March 7, 1950 — J. U. LEHN — 2,500,130
ANIMAL TRAP

Filed Feb. 26, 1947 — 5 Sheets-Sheet 3

INVENTOR.
JOHN U. LEHN
BY
Robert E. Burns
ATTORNEY

March 7, 1950   J. U. LEHN   2,500,130
ANIMAL TRAP

Filed Feb. 26, 1947   5 Sheets-Sheet 4

INVENTOR.
JOHN U. LEHN

BY
Robert E Burns
ATTORNEY.

March 7, 1950     J. U. LEHN     2,500,130
ANIMAL TRAP Filed Feb. 26, 1947     5 Sheets-Sheet 5

INVENTOR.
JOHN U. LEHN
BY
Robert E. Burns
ATTORNEY.

Patented Mar. 7, 1950

2,500,130

UNITED STATES PATENT OFFICE 2,500,130

ANIMAL TRAP

John U. Lehn, Lititz, Pa., assignor to Animal Trap Company of America, Lititz, Pa., a corporation of Pennsylvania Application February 26, 1947, Serial No. 731,011

15 Claims. (Cl. 43—88)

This invention relates to traps, particularly of the kind having leg embracing guards, and which are used for the trapping of foxes, coyotes, wolves, and other of the larger animals. However, the invention is equally applicable to any type of trap which utilizes gripping jaws for catching and holding the leg of the animal.

The leg embracing guard is provided to loosely embrace the leg and press against the body of the animal to hold the body of the animal away from the trap. As is well known in the trapping art, after the trap is sprung and grips the leg of the animal, the animal in many cases violently twists about until its leg is broken adjacent to the engagement of the jaws therewith and at a point between the jaws of the trap and the body of the animal, and in some instances the animal gnaws at its leg until it escapes from the trap, such an action being known in the trade as a "wring-off." In order to prevent such "wring-off" various means have been proposed including the use of a leg guard.

More particularly, this invention relates to improvements in leg embracing guards of the kind disclosed in my United States Patent No. 1,912,457. In that patent there is shown a single pair of jaws or gripping members for gripping a leg of an animal. The trap has a piovted leg embracing guard comprising a pair of substantially parallel rods held a fixed distance from each other and separated by a distance slightly greater than the outer edges of the two jaws when closed upon the leg of the animal. The rods are connected at their outer ends, and the guard is provided wtih a light independent spring of sufficient strength to overcome the weight of the animal to be trapped. The leg embracing guard is brought into substantially a horizontal position when the trap is set and is held by one of the jaws of the trap. When the trap is sprung and the jaws grip a leg of the animal in the usual manner, the leg embracing guard is moved by its spring in a direction away from the trap jaws, loosely engaging and pressing sidewise against the leg of the animal which is engaged by the jaws, and sliding freely along said leg until arrested by a stop on the trap or by engagement with a portion of the body of the animal. The leg embracing guard acts to hold the animal's head away from its leg and also to restrain the lateral movement of the leg, thus preventing the animal from bending the portion of the leg adjacent to the jaws to break the leg and to "wring off" or gnaw off the leg.

Traps as above described have been generally satisfactory excepting in the trapping of the larger and more powerful animals where the length of the legs of the animal or the strength and size of the bodies of the animal are such that the simple leg embracing guard cannot be readily utilized without making the trap too cumbersome for practical purposes. Further, it has been found that the simple type of leg guard does not readily permit of a design exerting sufficient force to restrain the larger and more powerful animals in their frantic efforts to free themselves when trapped. This type of guard tends to throw the animal towards the end of the trap where the leg guard is pivoted rather than holding the animal away from the trap.

It is an object of the present invention to provide a trap with an improved leg guard which fully overcomes the difficulty encountered in prior devices, and to provide a trap which is compact without any sacrifice in the effective length of the leg embracing guard. This is of importance in the transportation of the traps through woods and other inaccessible places where it is difficult to carry bulky articles. A further object is to provide a leg embracing guard which may, with some slight modifications, be incorporated into an attachment or accessory for standard traps.

In accordance with the present invention, there is provided, in addition to the basic trap having gripping members or jaws, a primary leg embracing guard pivoted at one end on the trap base and adapted to swing upwardly. A secondary leg embracing guard is mounted to swing on the primary leg embracing guard and adapted to swing upwardly therefrom with a different direction of rotation than the primary guard so that a resultant force is produced against the body of the animal in a direction directly away from the jaws of the trap rather than in a sidewise direction as heretofore provided. The primary and secondary guards are arranged to rest within one another when in the set position or when locked for transportation. The invention is advantageous as it makes it possible to incorporate leg guards into traps for animals of any size. A leg guard is provided which further eliminates the possibility of wring offs by its compound action on the body, leg and foot of the trapped animal. The animal is quickly tired to the point of exhaustion by moving against the spring action of the guard. The guard prevents the loss of smaller animals by pressing against the bodies of the animals and so preventing them from having sufficient freedom to crawl between the bars of the leg guard and later wring off their legs. The construction of the guard is such that it may easily be incorporated into traps now in use without the necessity of making changes in the basic design of the gripping jaws or releasing means. Means is preferably provided to delay the action of the guard until after the gripping jaws have engaged the leg of the animal.

Other objects and advantages of the invention will be apparent from the following description and claims, and from the accompanying drawings which show, by way of example, several embodiments of the invention.

Figure 1:
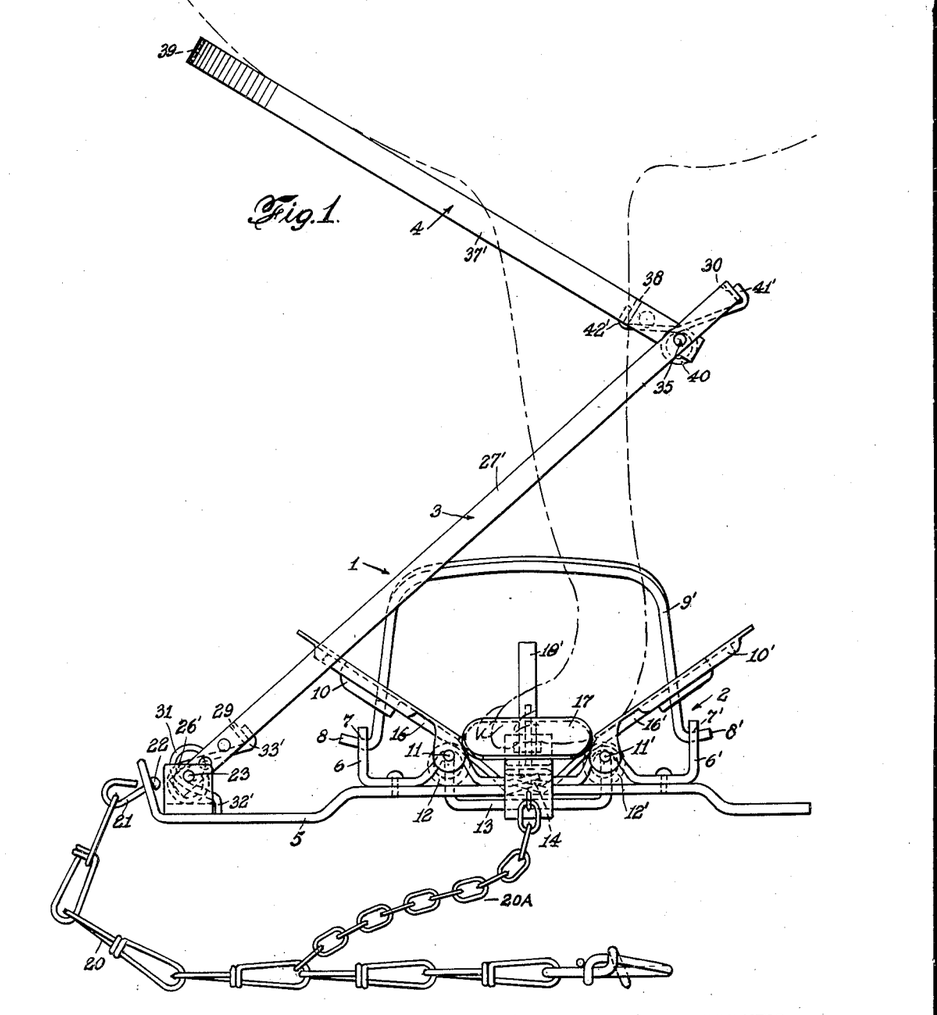
Fig. 1 is a side view of a trap in accordance with the invention. The trap is shown in the sprung position a portion of the leg and body of the trapped animal being shown in dot and dash line.

Referring to the drawings, there is shown in Fig. 1 a trap 1 in accordance with my invention comprised of a basic trap 2, primary guard 3 and secondary guard 4.

Figures 8, 9:
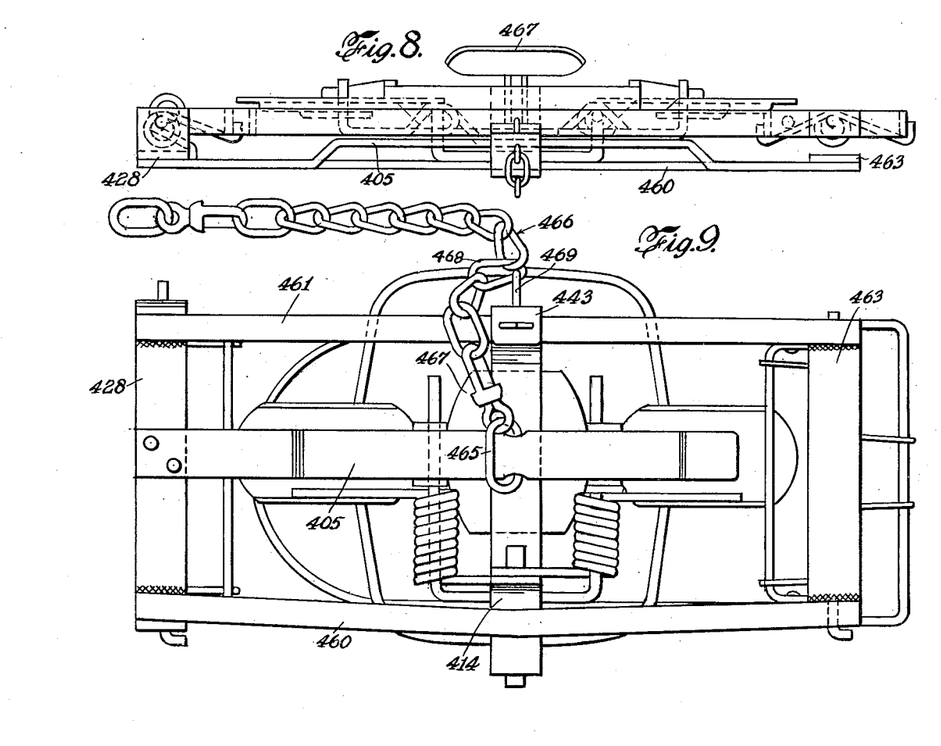
Fig. 8 is a side view of another embodiment of the invention in which the frame is additionally braced and the anchoring chain is attached to the center of the bottom of the trap.
Fig. 9 is a bottom view of the trap shown in Fig. 8.

The trap 2 (Figs. 1, 2 and 3) has a base or frame 5 with upturned extensions 6 and 6' provided with pivot apertures 7 and 7' to receive pivot portions 8 and 8' of the gripping jaws 9 and 9'. Closing arms 10 and 10' are pivotally mounted on pivot shafts 11 and 11' extending through the inner portions of frame extensions 6 and 6', and each is provided with spring coils 12 and 12' for operating the adjacent closing arms 10 and 10'. In this particular trap the pivot shafts 11 and 11' are connected by a crossbar 13 which is supported by the usual cross 14 secured to the main frame. The springs 12 and 12' are provided with arms 15 and 15' at their outer ends engaging with the cross 14 and actuating arms 16 and 16' at their inner ends engaging the under side of the adjacent closing arm to actuate it in a direction to close the jaws. The usual pan or treadle 17 is provided with a pivoted supporting arm 17', mounted on cross 14 and carrying a detent 18. The detent 18 engages with a latch 18' pivotally mounted on cross 14 and adapted to overlie one of the jaws 9 to form the releasing trigger of the trap when it is set. Each of the closing arms 10 and 10' is provided with apertures indicated at 19 and 19' which are adapted to surround the adjacent upturned extensions of the frame and engage the end portions of the jaws pivoted in said upturned portions. The trap is provided with a suitable anchoring connection to prevent its being dragged away by the animal trapped, the anchoring means being shown in Figs. 1 to 3 as a chain 20 attached at one end to the base of the trap by an eye 21 riveted at 22 to the upturned end of the frame 5 and having the other end provided with the usual ring for attachment to a tree, stump or the like. In Figs. 8 and 9 the anchoring means is shown attached to the bottom of the trap as later described.

Figures 2, 3, 4:
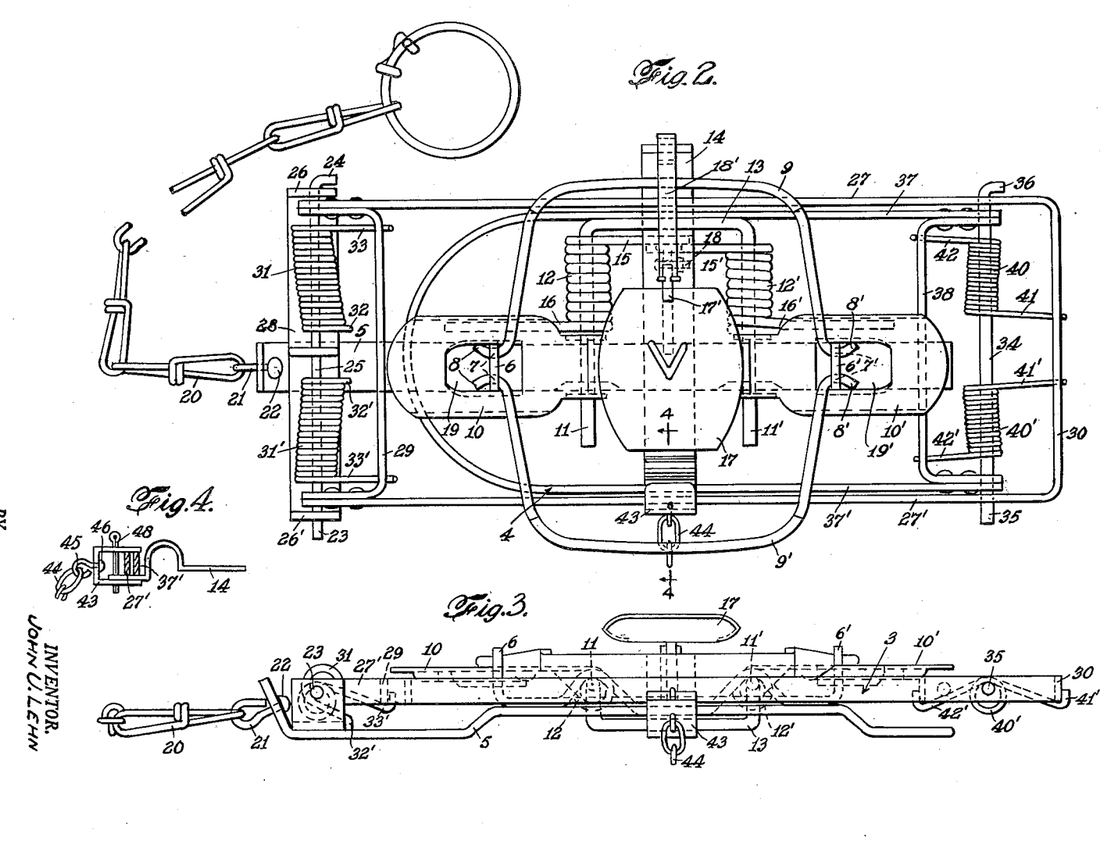
Fig. 2 is a top plan view of the trap in the set position.
Fig. 3 is a side view of the trap shown in Fig. 2 in the set position.
Fig. 4 is a fragmentary sectional view taken along the line 4—4 of Fig. 2 and showing the time delay and locking feature.

The primary leg embracing guard 3 is pivotally mounted on a pivot shaft 25 supported by bores in the spaced upwardly turned ends 26 and 26' of a crosspiece 28 welded or otherwise attached to frame 5. The pivot shaft is held in position by being provided with a head 23 and a bent over end 24. The leg guard comprises a pair of substantially parallel rods, strips or bars 27 and 27' held at all times in fixed relationship to each other and separated from each other by a cross bar 29 and an end piece 30. The rods are separated from each other a sufficient distance to provide a rigid means of support when in the elevated or extended position and yet not far enough to allow passage of the animal's body therebetween at any point, the arms being spaced sufficiently far apart for the guard to pass over the jaws 9 and 9' when the latter are in a closed position about the leg of an animal, and for the secondary guard 4 to nest therebetween in the set position. The arms of the guard 3 are of such length that when the guard is swung in a clockwise direction to the set position the end piece 30 will lie beyond closing arm 10'. The rods 27, 27' are herein illustrated as being made from one continuous piece of stock, the ends being joined to the cross bar 29 by riveted connections, by welding, or by any other suitable means to accomplish the same result. A pair of coil springs 31 and 31' for actuating the primary leg guard encircle the pivot shaft 25. The springs have inner ends 32 and 32' engaging crosspiece 28, while the outer ends 33 and 33' engage cross bar 29. The springs 31 and 31' tend to swing the guard away from the base in a counterclockwise direction.

The secondary leg embracing guard 4 is pivotally mounted on a pivot shaft 34 supported by aligned bores in rods 27 and 27' of the primary leg guard 3. The pivot shaft 34 is held in position by being provided with a head 35 and a bent over end 36. The secondary leg guard 4 is constructed similarly to primary leg guard 3, and comprises a pair of substantially parallel rods or bars 37 and 37' held at all times in fixed relationship to each other and separated from each other by a cross bar 38 and an end piece 39. The rods are spaced a distance permitting them to nest within the rods 27 and 27' of primary guard 3 with a working clearance. The rods of the secondary guard likewise may be made from one continuous piece of stock, the ends being joined by the crossbar 38 secured with riveted connections, by welding, or by any other suitable means. A pair of coiled springs 40 and 40' for actuating the secondary leg guard encircle the pivot shaft 34. The springs have their inner ends 41 and 41' engaging end piece 39 of the primary guard, while the outer ends 42 and 42' are engaged with crossbar 38 of the secondary guard. The springs 40 and 40' tend to swing the secondary guard away from the primary guard in a clockwise direction.

In order to set the trap, the secondary leg guard 4 is folded down to nest into the primary leg guard 3. The two guards in the nested position are then swung downward over the trap jaws, the closing arms 10 and 10' are swung downward permitting jaws 9 and 9' to open and fall into position over the guard members 27 and 27' and 37 and 37'. Latch 18' is swung over jaw 9 to engage detent 18 of treadle 17. Both primary and secondary guards will then be held substantially in horizontal position by the engagement of jaw 9 with rods 27 and 37, while rods 27' and 37' will be held in a horizontal position to permit loose jaw 9 to lie horizontal in the set position.

In tripping the trap the animal steps on treadle 17 releasing the jaws which close on and grip its leg. As the jaws close, the leg guards 3 and 4 are released and are swung by their respective springs up and about the leg of the animal to produce a resultant force against the body of the animal tending to straighten the leg of the animal and yieldingly resisting any bending thereof. The animal is thus prevented from wringing off the leg or from reaching closely enough to it to gnaw off the leg as the upper member of the leg guard automatically adjusts itself to the correct angle for engagement with the body of the animal and tends to hold it up away from the trap rather than throwing the animal towards the end of the trap as in the old form.

It is apparent that the compound guard might be constructed as a separate unit and attached to traps already in use. Such traps may be modified by drilling the base member 5 and by drilling crosspiece 28 and bolting the leg guard on the base of the trap. In the event the trap is not provided with a base plate 5 of sufficient length, a short extension piece may be provided extending frame 5 the required distance to attach the leg guard.

A time delay feature may be added to the guarded trap which is advantageous not only in that it permits the jaws of the trap to close upon the leg of the animal before the pressure is applied to the animal's body, but it provides a means of locking the leg embracing guard in the compact position during transportation of the trap. The time delay includes a U-shaped member 43 (Fig. 4) adapted to extend over rods 27' and 37' to clamp the members to the end of cross 14. A link 44 is connected at one end to the time delay U-shaped member 43 by means of eye 45 riveted at 46 or otherwise attached to the bottom of the member. The other end of chain link 44 is connected to chain 20 by a short length of chain 20a, as shown in Fig. 1, to provide a short loop 47, or the eye 45 may be attached directly to the anchor chain as in the embodiment shown in Fig. 9. After being caught in the trap, the animal, in struggling to free itself, will pull the chain 20 taut, straightening out loop 47 and pulling the U-shaped member free and releasing the guards. In order to lock the time delay feature in place while setting the trap, or during transportation thereof, a locking pin 48 is provided extending through the U-shaped member 43 and through a hole drilled in cross 14. The locking pin is removed after the trap is set.

Figure 5:
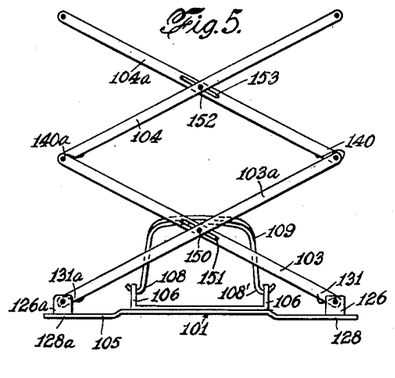
Fig. 5 is a side view of another embodiment of the invention showing the double leg guard in a pantograph construction.

In Fig. 5 a further embodiment of the invention is illustrated in which corresponding parts are the same as in Figs. 1 to 4 excepting as otherwise shown and described, the parts being designated by the same reference numerals with the addition of 100. A basic trap 101 having gripping jaws 109 pivotally mounted at 108 and 108' on extensions 106 and 106' of the base or frame 105 has a primary guard 103 pivotally mounted at one end in upwardly turned end 126 of a crosspiece 128 welded or otherwise attached to frame 105, the guard being actuated by coiled spring 131 as previously described. A secondary guard 104 is pivotally mounted on the primary guard and actuated by coiled spring 140 as in the first embodiment. A duplicate set of primary and secondary guard members 103a and 104a are pivotally mounted on an extension 126a of a second crosspiece 128a attached to frame 105. The pair of compound guards are alike in all respects excepting that the direction of rotation of one primary guard is reversed with respect to the other primary guard, and the direction of rotation of one secondary guard is reversed with respect to the other secondary guard, the rotation of the guards being provided by spring means as previously described. The arms on each side of the basic trap of the two sets of primary guards are pivoted together at 150, arm 103 being provided with a slot 151 and the arms on each side of the basic trap of the two sets of secondary guards are pivoted together at 152, arm 104a being provided with a slot 153 to form a pantograph type construction. The operation of this embodiment is similar to that previously described, the primary and secondary guards nesting together in the set position to provide a compact device. In this form the invention is advantageous for use in traps for larger animals because it lends itself to a stronger construction.

Figure 6:
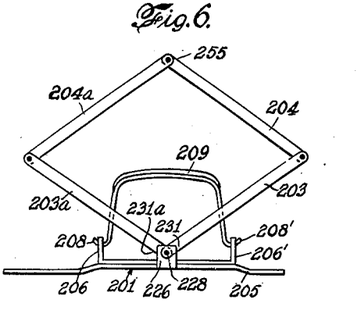
Fig. 6 is a side view of a still another embodiment of the invention showing a variation in the pantograph construction.

In Fig. 6 there is shown another embodiment of the invention in which corresponding parts are the same as in Figs. 1 to 5, excepting as otherwise shown and described, the parts being designated by the same reference numerals with the addition of 200. Basic trap 201 includes a base or frame 205 having upturned extensions 206 and 206' providing pivot mountings for griping jaws 209 pivoted at their ends 208 and 208'. Double primary guards 203 and 203a are shown pivotally mounted at one end in upwardly turned end 226 of crosspiece 228 which is welded or otherwise attached to frame 205, the guards being actuated by springs 231 and 231a. Double secondary guards 204a and 204 are pivotally mounted on the ends of the primary guards 203a and 203. The upper ends of the arms on each side of the basic trap of the second guards are pivoted together at 255. The pair of compound guards 203a and 203 are alike in all respects and each corresponds to the primary guard shown in Figs. 1–4. As guards 203a and 203 are provided with spring means adapted to rotate the guards upwardly from a horizontal position with regard to base 205, it is not necessary to provide spring means for the secondary guards. The secondary guards generally correspond to the secondary guards shown in Figs. 1–4 excepting that no end piece is provided at the outer ends of the guards, the respective secondary guards being pivoted together. The end piece is not used as it would interfere with pressing the guard down into the set position past jaws 209. The operation of this embodiment is similar to that previously described, the primary and secondary guards nesting together in the set position, as before, to produce a compact device. This form of the device is advantageous in that it is somewhat easier to set than the devices heretofore disclosed.

Figure 7:
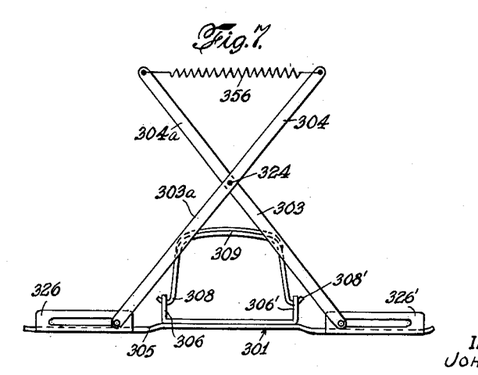
Fig. 7 is a side view of a still further embodiment of the invention showing the use of the operating spring as part of the guard.

In Fig. 7 a still further embodiment of the invention is illustrated in which corresponding parts are designated by the same reference numerals as in Figs. 1-4 with the addition of 300. In Fig. 7 there is shown a basic trap 301 having a base or frame 305 having upturned extensions 306 and 306' in which are pivotally mounted gripping jaws 309 at their pivoted ends 308 and 308'. A pair of primary guards 303a and 303 are slidably pivotally mounted in upturned extensions 326 and 326' of base 305, e. g., by slotting the extensions as shown. The secondary guards 304a and 304 are formed by extending primary guards 303a and 303. The pairs of guards are pivotally connected together at 324. Spring means 356 is connected between the outer ends of the pairs of secondary guards. In this form the spring means performs the dual function of actuating the leg guard and also constituting a leg confining means. Although not shown in the drawings, the pairs of primary guard members each comprise a pair of parallel rods or bars spaced by cross pieces at their lower ends similar to the construction described in connection with Figs. 1-4. End pieces are provided at the upper ends of the secondary guard members. The operation of this embodiment is similar to that previously described, the guards nesting together in a horizontal plane while in the set position.

In Figs. 8 and 9 another embodiment of the invention is illustrated in which corresponding parts are designated by the same reference numerals as in Figs. 1-4 with the addition of 400. This embodiment is similar to that shown in Fig. 3 excepting that it includes the feature in that the frame 405 is reinforced by the additional longitudinally extending thin metal braces 460 and 461. The braces are welded or otherwise attached at one end to crosspiece 428, a laterally extending spacer 463 being likewise fastened to the other ends of braces 460 and 461. To assure further rigidity to the construction, the braces 460 and 461 may also be fastened in the same manner to cross 414. A further feature of this embodiment is the anchoring connection at the center of the bottom of the trap. A chain link 465 is placed around frame 405 being retained against longitudinal displacement in a recessed pocket between the frame 405 and the cross 414. A swivel link 467 prevents the anchoring chain from tangling during the struggles of the animal to escape. A link 468 of chain 466 is engaged by eyelet 469 attached to the U-shaped member 443 which provides the time delay feature as previously described. This embodiment permits of the use of a shorter chain. The use of the braces on the bottom of the trap together with the center connection of the anchoring chain has been found to prevent the animal from bending the braces of the trap during its struggles when caught therein.

Figure 10:
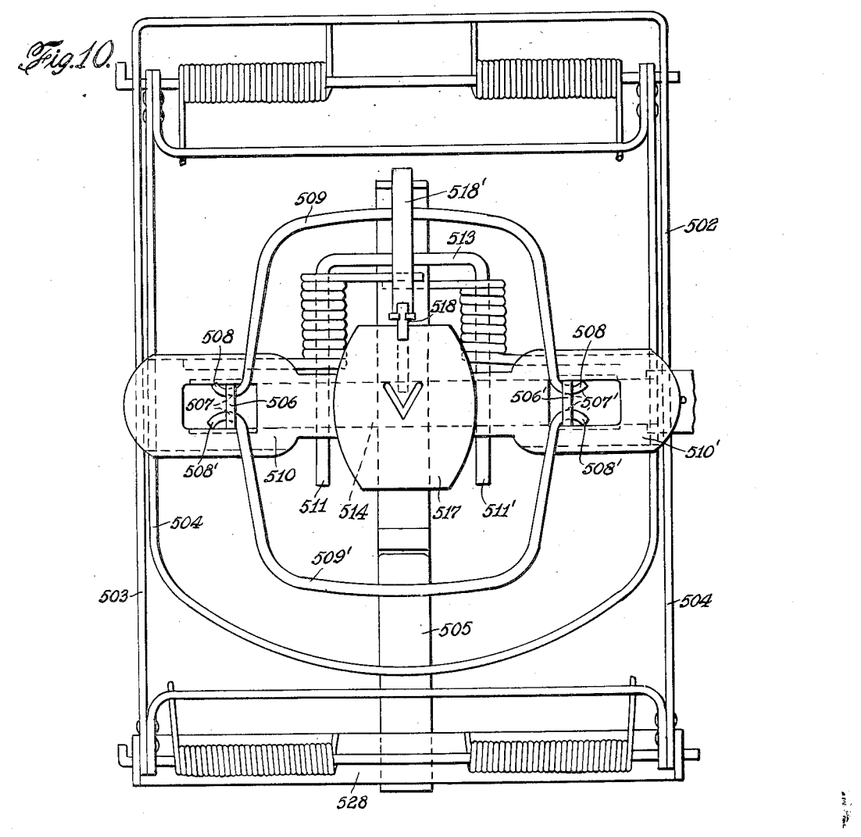
Fig. 10 is a top view of another embodiment of the invention in which the pivotal axis of the leg guard is parallel to the pivotal axis of the jaws.
Figure 11:
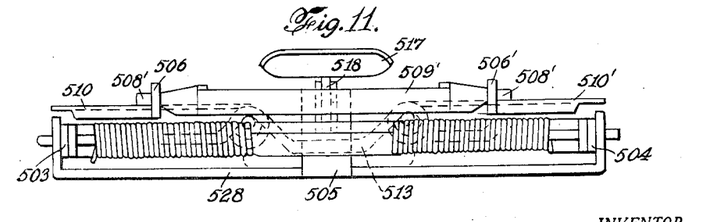
Fig. 11 is an end view of the trap shown in Fig. 10.

In Figs. 10 and 11 there is shown an embodiment of the invention in which the pivoting axis of the leg guard is parallel to the pivoting axis of the gripping jaws. In this embodiment the parts are designated by the same reference numerals as in Figs. 1-4 with the addition of 500. The trap differs from that shown in Figs. 1-4 in that the base or frame 505 is provided with a cross member 514 positioned at right angles to the frame member 505. The cross member provides a support for upturned extensions 506 and 506' having apertures 507 and 507' carrying pivot portions 508 and 508' of gripping jaws 509 and 509'. Closing arms 510 and 510' are pivotally mounted on pivot shafts 511 and 511' connected by a cross bar 513 mounted on frame 505. A pan or treadle 517 is mounted on the frame 505 which also carries latch 518' engaging with a detent 518 in the treadle. The crosspiece 528 is attached to frame 505 and positioned at right angles thereto as described in Figs. 1 to 4 for supporting leg guards 503 and 504. This embodiment is advantageous in that the leg guards may be held in the set position by the ends of closing arms 510 and 510'.

From the preceding description it will be apparent that many other embodiments are possible in accordance with the invention. Further the leg guard is applicable for use with other forms of basic trap than the form shown. A guarded trap of the type disclosed has numerous advantages from the standpoint of manufacture and use. The trap is compact and may be easily transported through the woods or other inaccessible places. The guard may be constructed as a separate article and may be readily attached to traps now in use merely by drilling a hole for the attachment of the crosspiece.

Accordingly, it should be understood that the above mentioned embodiments of the invention are illustrative and should not be regarded as limiting the scope of the following claims.

I claim:

1. The combination with a trap having gripping means, of a leg guard comprising a pair of spaced primary lateral members, mounting means on said trap for one end of each of said primary members, pivotal means on said primary members spaced from said mounting means, a pair of spaced secondary lateral members respectively pivotally mounted on said pivotal means, and spring means for swinging said primary lateral members into raised positions with respect to said trap and said secondary members into raised positions with respect to said primary members.

2. The combination with a trap having gripping means, of a leg guard comprising a pair of spaced primary lateral members, pivotal mounting means on the base of said trap for one end of each of said primary members, pivotal means on said primary members spaced from said mounting means, a pair of spaced secondary lateral members respectively pivotally mounted on said pivotal means, and spring means for swinging said primary lateral members into raised positions with respect to the base of said trap and said secondary members into raised positions with respect to said primary members.

3. In an animal trap the combination with gripping means of a compound leg guard comprised of a pair of spaced lateral primary members pivotally mounted at one end for rotation in one direction about said one end, the other end of said members being connected together, a second pair of spaced lateral secondary members pivotally mounted respectively on the primary members for rotation in a direction opposite to the direction of rotation of said first members, the outer ends of the secondary members being connected together, the members of each pair of members being spaced sufficiently to provide a rigid means of support but insufficiently to allow passage of the body of the animal therebetween, and means for rotating said primary and said secondary members about their respective pivotal mountings to raise them with respect to the trap and to each other, the pairs of members in the set position of the trap being arranged to nest with respect to each other and in the tripped position of the trap to extend around the gripping means and the leg of an animal held thereby to exert a force against the body of the animal.

4. In an animal trap the combination with gripping means of a compound leg guard comprised of a pair of spaced lateral primary members pivotally mounted at one end for rotation in one direction about said one end, a second pair of spaced lateral secondary members pivotally mounted respectively on the primary members for rotation in a direction opposite to the direction of rotation of said first members, the members of each pair of members being spaced sufficiently to provide a rigid means of support but insufficiently to allow passage of the body of the animal therebetween, and means for rotating said primary and said secondary members about their respective pivotal mountings to raise them with respect to the trap and to each other, the pairs of members in the set position of the trap being arranged to nest with respect to each other and in the tripped position of the trap to extend around the gripping means and the leg of an animal held thereby to exert a force against the body of the animal.

5. In a trap, a base, gripping jaws mounted thereon, means for releasably holding the jaws in set position, and a leg guard, said leg guard including a pair of spaced primary lateral members pivotal mounting means for one end of each of said primary members, spring means for swinging said primary members upward from a horizontal position with respect to said base, a pair of spaced secondary lateral members, pivotal mounting means on each of said primary members for mounting said secondary members, and secondary spring means for swinging said secondary members upward from a parallel position with respect to said primary members.

6. In a trap, a base, gripping jaws mounted thereon, jaw releasing means, and a leg guard, pivotal mounting means for said leg guard, the leg guard including primary lateral members transversely mounted at one end on said pivotal mounting means and spaced thereby, primary spring means for raising said primary members with respect to said base, secondary transversely mounted pivotal means at the other ends of said primary members, secondary lateral members mounted at one end of said secondary pivotal means and spaced thereby, and secondary spring means for raising said secondary members with respect to said primary members, said secondary members having their outer ends connected together, said secondary members being adapted to nest within said primary members in set position of the trap, the space between the secondary members being only sufficient to pass the jaws when gripped about the leg of an animal, but insufficient to pass about the body of the animal.

7. In an animal trap, the combination with a longitudinally extending frame, gripping jaws pivotally mounted thereon, the axis of said jaws being parallel with said frame, and a transversely disposed primary supporting pivot carried by said frame, of a compound guard comprising primary and secondary guards, the primary guard including a pair of substantially parallel members separated from each other a sufficient distance to provide a rigid means of support when in an extended position but spaced an insufficient distance to allow passage of the animal's body therebetween, said parallel members being connected together, the inner ends thereof being pivotally mounted on said primary pivotal support, a primary guard actuating spring operatively mounted between said base and said inner end of the primary guard and adapted to swing the primary guard upwardly from said jaws, a transversely disposed secondary supporting pivot carried at the other end of said primary guard, the secondary guard including a pair of substantially parallel members connected together, the inner ends thereof being pivotally mounted on said secondary pivotal support, and a secondary guard actuating spring operatively mounted between said primary guard and said secondary guard, and adapted to swing the secondary guard upwardly from said primary guard, the secondary guard being formed of a size such that it will nest within the primary guard when both are in a set position.

8. In an animal trap, the combination with a longitudinally extending frame, gripping jaws pivotally mounted thereon, the axis of said jaws being parallel with said frame, an actuating jaw spring for said jaws, a latch for engaging one of said jaws a releasing treadle for holding said latch when the trap is set, and a transversely disposed primary supporting pivot carried by said frame exterior to one end of said jaws, of a compound guard comprising primary and secondary guards, the primary guard including a pair of substantially parallel members held at all times in fixed relationship to each other and separated from each other a sufficient distance to provide a rigid means of support when in an extended position but spaced an insufficient distance to allow passage of the body of the animal therebetween, said parallel members formed from one continuous piece of stock, the inner ends thereof being rigidly held in spaced relationship by an end piece and being pivotally mounted on said primary pivotal support, a primary guard actuating spring operatively mounted between said base and said inner end of the primary guard and adapted to swing the primary guard upwardly from said jaws, a transversely disposed secondary supporting pivot carried at the other end of said primary guard, the secondary guard including a pair of substantially parallel members held at all times in fixed relationship to each other, said members being formed from one continuous piece of stock, the inner ends thereof being rigidly held in spaced relationship by an end piece and being pivotally mounted on said secondary pivotal support, and a secondary guard actuating the spring operatively mounted between said primary guard and said secondary guard and adapted to swing the secondary guard upwardly from said primary guard, the secondary guard being formed of a size such that it will nest within the primary guard when both are in a set position, said primary and secondary guards being adapted to be held in horizontal position below said jaws when the trap is in set position and upon release of said jaws by said releasing treadle to extend upwardly loosely confining the leg and pressing against the body of the animal held by the jaws.

9. In an animal trap, the combination with a longitudinally extending frame, gripping jaws pivotally mounted thereon, the axis of said jaws being parallel with said frame, an actuating jaw spring for said jaws, and a transversely disposed primary supporting pivot carried by said frame exterior to one end of said jaws, of a compound guard comprising primary and secondary guards, the primary guard including a pair of substantially parallel members held at all times in fixed relationship to each other and separated from each other a sufficient distance to provide a rigid means of support when in an extended position but spaced an insufficient distance to allow passage of the body of the animal therebetween, said parallel members being formed from one continuous piece of stock, the inner ends thereof being rigidly held in spaced relationship by the end piece and being pivotally mounted on said primary pivotal support, a primary guard actuating spring operatively mounted between said base and said inner end of the primary guard and adapted to swing the primary guard upwardly from said jaws, a transversely disposed secondary supporting pivot carried at the other end of said primary guard, the secondary guard including a pair of substantially parallel members held at all times in fixed relationship to each other, said members being formed from one continuous piece of stock, the inner ends thereof being rigidly held in spaced relationship by an end piece, and being pivotally mounted on said secondary pivotal support, a secondary guard actuating spring operatively mounted between said primary guard and said secondary guard and adapted to swing the secondary guard upwardly from said primary guard, the secondary guard being formed of a size such that it will nest within the primary guard when both are in a set position, an anchoring connection for said base and a delayed action clip detachably embracing the base, and one member of each of said primary and secondary guards releasably holding the guards in horizontal position, said clip being connected to said anchoring connection intermediate its end, a slack portion of said connection being provided between said clip and the ends of the connection attached to said base.

10. In an animal trap, the combination with a longitudinally extending frame, gripping jaws pivotally mounted thereon, the axis of said jaws being parallel with said frame, an actuating jaw spring for said jaws, and a transversely disposed primary supporting pivot carried by said frame exterior to one end of said jaws, of a compound guard comprising primary and secondary guards, the primary guard including a pair of substantially parallel members held at all times in fixed relationship to each other and separated from each other a sufficient distance to provide a rigid means of support when in an extended position but spaced an insufficient distance to allow passage of the body of the animal therebetween, said parallel members being formed from one continuous piece of stock, the inner ends thereof being rigidly held in spaced relationship by an end piece and being pivotally mounted on said primary pivotal support, a primary guard actuating spring operatively mounted between said base and said inner end of the primary guard and adapted to swing the primary guard upwardly from said jaws, a transversely disposed secondary supporting pivot carried at the other end of said primary guard, the secondary guard including a pair of substantially parallel members held at all times in fixed relationship to each other, said members being formed from one continuous piece of stock, the inner ends thereof being rigidly held in spaced relationship by an end piece and being pivotally mounted on said secondary pivotal support, a secondary guard actuating spring operatively mounted between said primary guard and said secondary guard, the secondary guard being formed of a size such that it will nest within the primary guard when both are in a set position, an anchoring connection for said base, and a removable pin extending through said clip and said base adapted to prevent premature tripping of said guards.

11. The combination with a trap having gripping means of a leg guard comprising a pair of spaced primary lateral members, mounting means carried by said trap for one end of each of said primary members, pivotal means on said primary members spaced from said mounting means, a pair of spaced secondary lateral members respectively pivoted on said pivotal means, and removable means independent of said gripping means for holding said leg guard in set position, said means being adapted to be attached to a portion of an anchoring means for said trap, a slack portion of said anchoring connection being provided between said removable means and the end of the anchoring connection attached to said trap.

12. For use with an animal trap, a compound leg guard comprising a mounting support adapted to be attached to a trap having gripping jaws, primary pivoting means, a U-shaped primary member having parallel side arms spaced a sufficient distance to pass over the jaws of a trap when said jaws are gripped about the leg of the animal, said space being insufficient to permit the body of the animal to pass therethrough, said open end of said member being pivoted on said primary pivoting means, a primary member actuating spring operatively connected between said member and said support, secondary pivoting means mounted adjacent the normally closed end of said primary member, a U-shaped secondary member having parallel side arms spaced to pass over the jaws of the trap when gripped about the leg of the animal and to nest within said primary member, the spacing of said arms being insufficient to permit the body of the animal to pass therethrough, said open end of said secondary member being pivoted in said secondary pivoting means, and a secondary member actuating spring operatively connected between said secondary member and said normally closed end of said primary member.

13. A compound leg guard for use with a trap having gripping means, comprising supporting means adapted to be attached to the trap, one U-shaped member hinged to said supporting means at one end for upward swinging movement from a horizontal position with said supporting means, a second U-shaped member hinged to the other end of said one U-shaped member for upward swinging movement from a parallel position with said one U-shaped member to be raised with respect to the latter, the direction of rotation of said second member about its hinge being opposite to the direction of rotation of said one member about its hinge, and spring means for both the primary member and the secondary member to cause said rotative movements.

14. A compound leg guard for use with a trap having gripping means, comprising supporting means adapted to be carried by the trap, a pair of spaced primary lateral members forming a primary guard, pivotal means carried by said primary guard and spaced from said supporting means, a pair of spaced secondary lateral members forming a secondary guard pivotally mounted on said pivotal means, and spring means for swinging said guards into a raised position with respect to the trap and with respect to each other.

15. In an animal trap, the combination with a longitudinally extending frame, gripping jaws pivotally mounted thereon, the axis of said jaws being perpendicular to the length of said frame, and a transversely disposed primary supporting pivot carried by said frame, of a compound guard comprising primary and secondary guards, the primary guard including a pair of substantially parallel members separated from each other a sufficient distance to provide a rigid means of support when in an extended position but spaced an insufficient distance to allow passage of the animal's body therebetween, said parallel members being connected together, the inner ends thereof being pivotally mounted on said primary pivotal support, a primary guard actuating spring operatively mounted between said base and said inner end of the primary guard and adapted to swing the primary guard upwardly from said jaws, a transversely disposed secondary supporting pivot carried at the other end of said primary guard, the secondary guard including a pair of substantially parallel members connected together, the inner ends thereof being pivotally mounted on said secondary pivotal support, a secondary guard actuating spring operatively mounted between said primary guard and said secondary guard and adapted to swing the secondary guard upwardly from said primary guard, the secondary guard being formed of a size such that it will nest within the primary guard when both are in set position.

JOHN U. LEHN.

REFERENCES CITED

The following references are of record in the file of this patent:

UNITED STATES PATENTS

| Number | Name | Date |
| --- | --- | --- |
| 1,333,017 | Gibbs | Mar. 9, 1920 |
| 1,912,457 | Lehn | June 6, 1933 |
| 2,123,094 | Briddell | July 5, 1938 |